United States Patent [19]
Shumaker

[11] Patent Number: 6,142,140
[45] Date of Patent: Nov. 7, 2000

[54] CANTILEVER SHELF UNIT FOR KETTLE STYLE BARBEQUE GRILL

[76] Inventor: Todd A. Shumaker, 24394 Alta Vista Dr., Dana Point, Calif. 92629

[21] Appl. No.: 09/338,324

[22] Filed: Jun. 22, 1999

Related U.S. Application Data

[60] Provisional application No. 60/090,659, Jun. 25, 1998.

[51] Int. Cl.[7] ............................................. A47B 47/00
[52] U.S. Cl. .......................... 126/9 B; 108/24; 108/25; 108/152; 211/70.7
[58] Field of Search .............................. 108/152, 24, 25, 108/50.11, 135; 211/70.7, 70.6, 90.01, 153, 133.6

[56] References Cited

U.S. PATENT DOCUMENTS

| | | | |
|---|---|---|---|
| 2,768,042 | 10/1956 | Persinger et al. | 126/9 B |
| 2,787,995 | 4/1957 | Alter | 126/25 R |
| 2,886,386 | 5/1959 | Spitzer | 126/25 R |
| 4,337,751 | 7/1982 | Sampson et al. | 126/9 B |
| 4,628,896 | 12/1986 | Baynes | 126/25 R |
| 4,665,888 | 5/1987 | Christen, Jr. et al. | 126/25 R |
| 4,688,541 | 8/1987 | Stephen et al. | 126/9 B |
| 5,104,080 | 4/1992 | Berger | 126/25 R |
| 5,941,228 | 8/1999 | McKenzie | 126/25 R |

*Primary Examiner*—Ira S. Lazarus
*Assistant Examiner*—Sara Clarke
*Attorney, Agent, or Firm*—Hovey, Williams, Timmons & Collins

[57] ABSTRACT

A one-piece, integral metallic cantilever-mounted shelf unit (10) for kettle-type barbeque grills (14) is provided which provides a sturdy, stable work surface which can be readily attached and detached from a grill (14) without grill modification or use of fasteners. The shelf unit (10) includes opposed upper and lower panels (22, 24) interconnected by an outermost bight section (26). Mounting structure (28) in the form of a lip (30) and flange (34) form a part of the upper and lower panels (24, 26), respectively, and allow attachment of the shelf unit (10) to a grill unit (14) in a cantilever fashion while still permitting use of the grill lid. The upper and lower panels (24,26) are preferably provided with stamped depressions (36) and corresponding slots (38); this provides additional strength, allows liquid drainage and facilitates air cooling of the shelf unit (10). A series of hook bodies (44) are preferably formed in the lower panel (24), allowing storage of barbeque utensils.

18 Claims, 2 Drawing Sheets

CANTILEVER SHELF UNIT FOR KETTLE STYLE BARBEQUE GRILL

RELATED APPLICATIONS

This application claims the priority benefit of provisional application Ser. No. 60/090,659, filed Jun. 25, 1998.

BACKGROUND OF THE INVENTION

1. Field of the Invention

The present invention is broadly concerned with shelf units designed for removable cantilever attachment to the bowl of a kettle-type barbeque grill in order to provide useful work space and convenient storage for barbeque implements. More particularly, the invention is concerned with a low cost, stable integrally formed metallic shelf unit adapted for ready cantilever attachment to a grill bowl, without the need for bowl modification or fasteners of any type.

2. Description of the Prior Art

Portable kettle-type barbeque grills (e.g., those commercialized by the Weber-Stephens Products Company as "Weber" grills) are relatively lightweight and are equipped with wheels for mobility and ease of use in a variety of environments. These grills are very popular with the consuming public worldwide. As sold however, such kettle-type grills do not have shelf attachments which are common in larger rectangular grills. This creates a problem with the kettle grills, because they do not provide convenient work space or storage area for condiments, cooking utensils or beverages.

There is accordingly a need for a shelf unit adapted for easy cantilever connection to kettle-type barbeque grills and which is inexpensive, weather resistant, stable and characterized by ease of attachment and detachment, all without interfering with use of the grill lid.

SUMMARY OF THE INVENTION

The present invention overcomes the problems above and provides a shelf unit for removable cantilever attachment to the bowl of a barbeque grill without the need for grill modification, fasteners, or tools. The shelf unit is advantageously in the form of an integral, one-piece stamped metallic body having a lip section adapted to engage the upper periphery of the bowl and an abutment section for engaging the bowl sidewall beneath the periphery. The lip and abutment sections cooperatively support outwardly extending upper and lower shelf-defining panels.

In preferred forms, the shelf unit panels are equipped with appropriate side marginal recessing and implement hooks to facilitate storage of cooking utensils. Moreover, in order to enhance the rigidity of the shelf unit, a series of stamped depressions are formed in the upper and lower panels, with each depression having a slot at the base thereof. These slots also permit drainage and enhance airflow through the shelf unit to assist in cooling thereof.

DETAILED DESCRIPTION OF THE PREFERRED EMBODIMENTS

Figure 1:
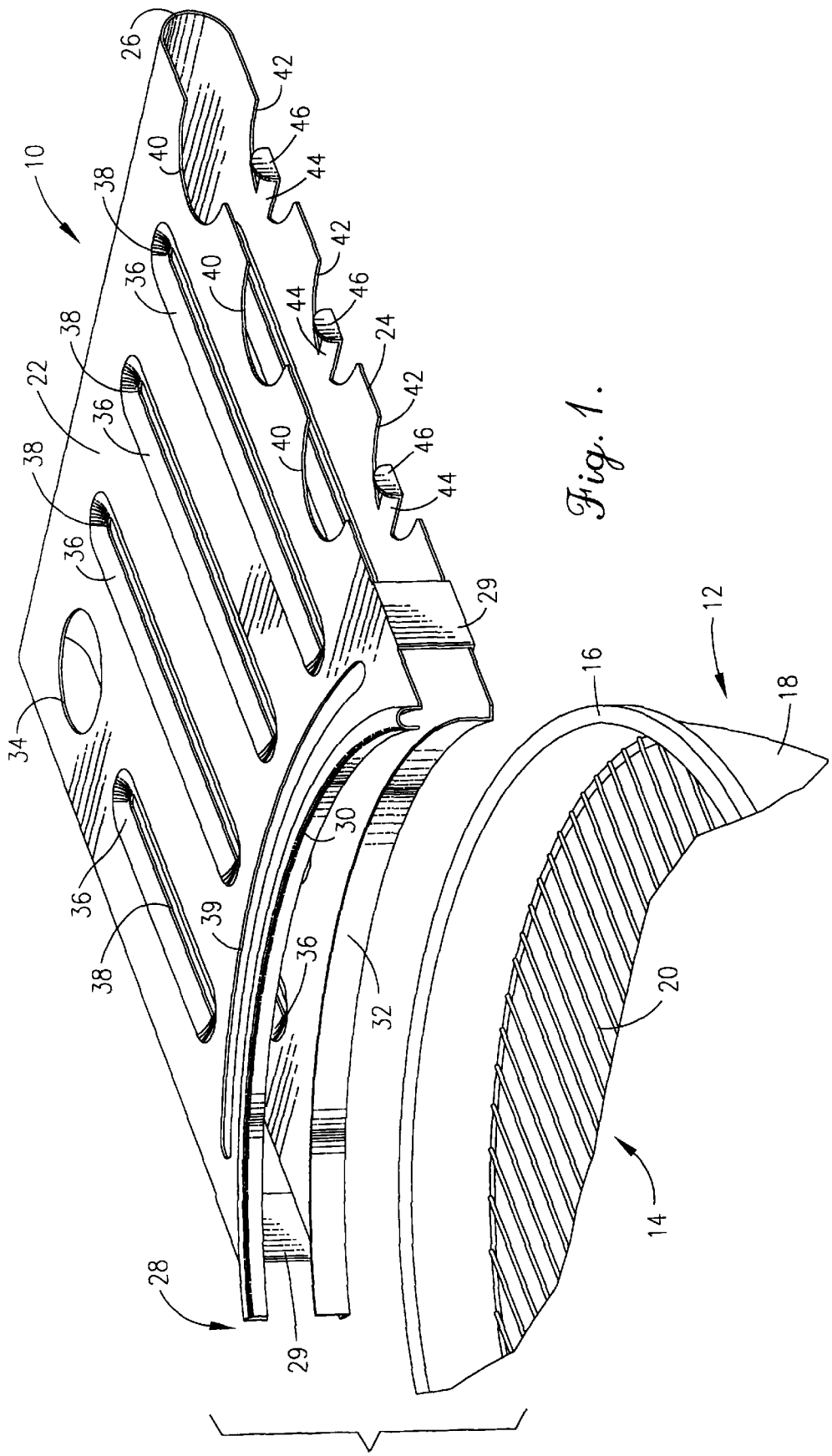
FIG. 1 is a fragmentary, perspective exploded view of a kettle-type barbeque grill bowl with a shelf unit in accordance with the invention.
Figure 2:
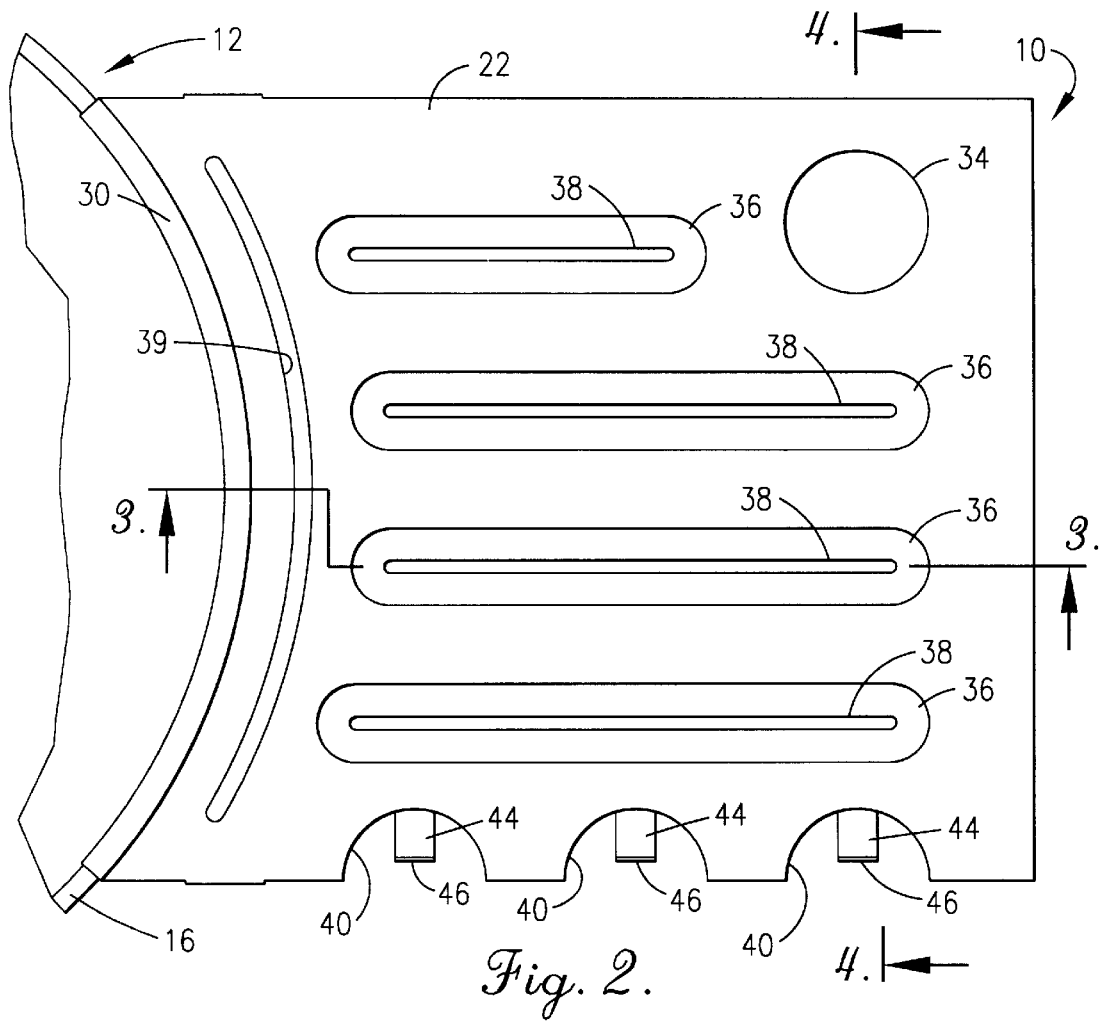
FIG. 2 is a fragmentary top view illustrating the shelf unit of the invention mounted on a grill bowl and extending outwardly therefrom.

Turning now to the drawings, a shelf unit 10 is illustrated which is designed for cantilever attachment to the bowl 12 of a conventional kettle-type barbeque grill 14. As shown, the bowl 12 includes an uppermost, enlarged lip or periphery 16, with a depending, arcuate sidewall 18. As will be readily appreciated, the bowl 12 supports a metallic grill 20 therein, and is adapted to receive charcoal beneath the grill 20 for cooking purposes.

Figure 3:
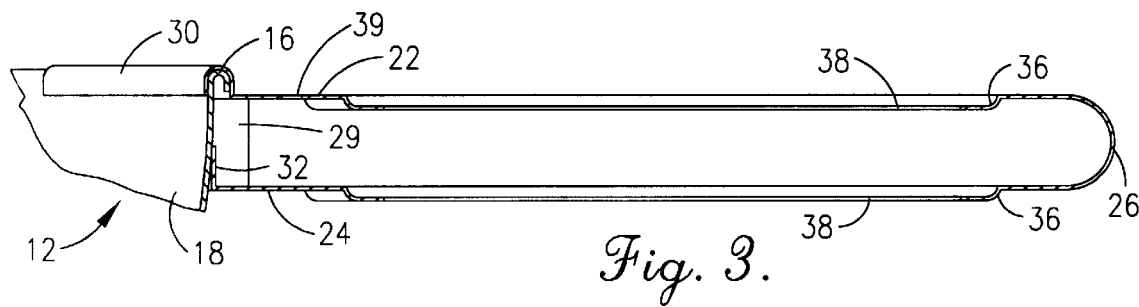
FIG. 3 is a vertical sectional view taken along line 3—3 of FIG. 2 and illustrating details of construction of the shelf unit.
Figure 4:
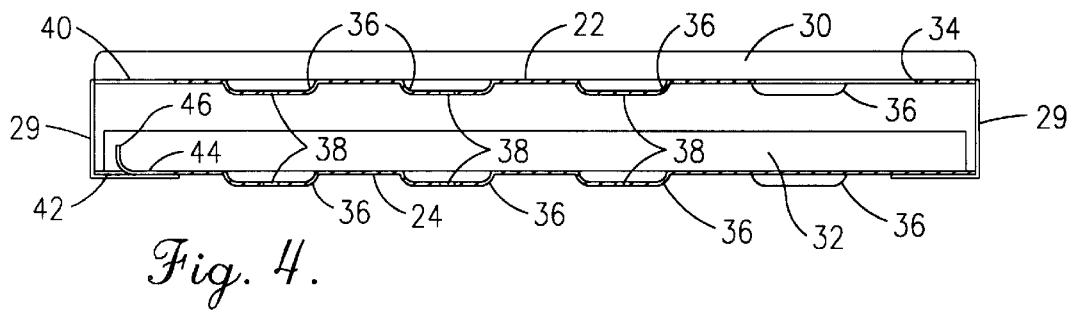
FIG. 4 is a vertical sectional view taken along line 4—4 of FIG. 2 and further showing the shelf unit construction.

The shelf unit 10 is in the form of a stamped, integral metallic body presenting an upper panel 22, an opposed lower panel 24, an arcuate bight section 26 interconnecting the panels 22, 24, and mounting structure 28 adjacent the free ends of the panels 22,24 for rapid mounting of the shelf unit 10 on bowl 12. A pair of opposed, upright side tabs 29 extend from top panel 22 and engage and support bottom panel 24 as shown in FIG. 4, so as to provide further strengthening for the shelf unit 10. The mounting structure 28 includes an elongated, compound arcuate lip section 30 of inverted, u-shaped configuration which forms a part of upper panel 22, as well as an upstanding arcuate flange 32 which forms the forwardmost portion of lower panel 24. As will be readily appreciated from a configuration of FIG. 3, the lip section 30 is designed to fit over the periphery 16 of bowl 12, where as flange 32 abuts bowl sidewall 18 beneath the periphery 16.

It will be observed that upper panel 22 includes a circular opening 34 therein which is adapted to receive a beverage container such as a soda or beer can or bottle. Of course, owing to the fact that opening 34 is above the lower panel 24, the latter serves as a support as the base of a beverage container. In addition, the upper panel 22 has a series of elongated, parallel, spaced-apart stamped depressions 36 formed therein, with a slot 38 provided at the base of each such depression. Also, the upper panel 22 has an arcuate slot 39 generally parallel with the lip section 30 and between the latter and the depressions 36; the slot 39 serves to inhibit heat transfer from the bowl 12 to the remainder of the shelf unit 10. In like manner, the bottom panel 24 has a similar series of depressions 36 and slots 38 which are in substantial alignment with those of the upper panel 22. The slots 38 allow for drainage of liquids, and also provide air circulation so as to prevent undue heating of the shelf unit 10. Further, the stamped depressions 36 provide stiffening for the shelf unit 10.

The upper and lower panels 22, 24 are each provided with three spaced, generally semicircular recesses 40, 42 in the side margins thereof, with pairs of the recesses being in general vertical alignment. It will be seen that in each of the lower panel recesses 42 includes a central, outwardly extending hook body 44 terminating in an upturned tab 46. This permits hanging of barbeque implements from the body so as to maintain these utensils in a ready position for use.

It will be appreciated that the shelf unit 10 may be easily mounted on the bowl 12 of a barbeque grill 14, simply by placing the lip section 30 over a convenient portion of the bowl periphery 16, while allowing the flange 32 to abut bowl sidewall 18. Preferably, the shelf unit 10 is placed directly over one of the three legs of the grill; it has been found that such placement prevents tipping of the grill and thus enhances the stability of the grill/shelf unit combination. During use, the shelf unit 10 can be employed as a work surface for the placement of plates or pans of food items to be cooked. Also, barbeque implements can be hung from the hooks 44 so that they can be readily accessed. It will also be seen that the attachment of shelf unit 10 does not in any way interfere with the use of the grill lid (not shown). After cooking is completed, the shelf unit 10 can remain in place indefinitely or be easily detached from the grill and can be cleaned by hosing or other conventional manner.

I claim:

1. In combination:

a barbeque grill having a bowl having an upper periphery and a sidewall; and a shelf unit secured to said bowl and extending generally horizontally outwardly therefrom, said shelf unit including a lip section engaging said upper periphery, an abutment section engaging said sidewall below the periphery, and a shelf comprising upper and lower panels respectively secured to said lip section and abutment section, said lip section and abutment section cooperatively supporting said shelf on said bowl.

2. The combination of claim 1, said shelf unit being generally u-shaped in cross section, there being an arcuate bight interconnecting said upper and lower panels.

3. The combination of claim 1, including an opening in said upper panel adapted to receive therein a beverage container, with the base of said container supported by said lower panel.

4. The combination of claim 1, at least one of said panels having an implement hook for retaining a barbeque implement.

5. The combination of claim 1, said upper panel having a series of spaced recesses formed adjacent a side margin thereof, said lower panel including a series of recesses in general alignment with said upper panel recesses, said lower panel recesses each having a projecting implement hook.

6. The combination of claim 1, at least one of said panels having a number of drainage slots formed therein.

7. The combination of claim 6, both of said panels having drainage slots formed therein.

8. The combination of claim 1, said upper panel having a plurality of elongated, spaced apart depressions with a slot formed at the base of each depression.

9. The combination of claim 1, said shelf unit being integrally formed of metal.

10. A shelf unit for removable attachment to a barbeque grill bowl having an upper periphery and a sidewall, said shelf unit comprising an integral metallic body including a lip section adapted for engaging the upper periphery of the bowl, an abutment section adapted for engaging the sidewall of the bowl below the periphery, and a shelf including upper and lower panels respectively secured to said lip section and abutment section respectively, said lip section and abutment section cooperatively supporting said shelf on the bowl.

11. The shelf unit of claim 10, said shelf unit being generally u-shaped in cross-section, there being an arcuate bight interconnecting said upper and lower panels.

12. The shelf unit of claim 10, including an opening in said upper panel adapted to receive therein a beverage container, with the base of said container supported by said lower panel.

13. The shelf unit of claim 10, at least one of said panels having an implement hook for retaining a barbeque implement.

14. The shelf unit of claim 10, said upper panel having a series of spaced recesses formed adjacent a side margin thereof, said lower panel including a series of recesses in general alignment with said upper panel recesses, said lower panel recesses each having a projecting implement hook.

15. The shelf unit of claim 10, at least one of said panels having a number of drainage slots formed therein.

16. The shelf unit of claim 15, both of said panels having drainage slots formed therein.

17. The shelf unit of claim 10, said upper panel having a plurality of elongated, spaced apart depressions with a slot formed at the base of each depression.

18. The shelf unit of claim 10, said shelf unit formed of metal.

* * * * *